United States Patent
Yonaha

(10) Patent No.: US 12,283,035 B2
(45) Date of Patent: Apr. 22, 2025

(54) INFORMATION DISPLAY APPARATUS, INFORMATION DISPLAY METHOD, AND INFORMATION DISPLAY PROGRAM

(71) Applicant: FUJIFILM Corporation, Tokyo (JP)

(72) Inventor: Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 664 days.

(21) Appl. No.: 17/572,704

(22) Filed: Jan. 11, 2022

(65) Prior Publication Data

US 2022/0130030 A1 Apr. 28, 2022

Related U.S. Application Data

(63) Continuation of application No. PCT/JP2020/021598, filed on Jun. 1, 2020.

(30) Foreign Application Priority Data

Jul. 18, 2019 (JP) .................................. 2019-132789

(51) Int. Cl.
G06T 7/70 (2017.01)
G01N 21/88 (2006.01)
(Continued)

(52) U.S. Cl.
CPC ....... *G06T 7/0004* (2013.01); *G01N 21/8851* (2013.01); *G06T 7/70* (2017.01);
(Continued)

(58) Field of Classification Search
CPC ......... G06T 7/0004; G06T 7/70; G06T 15/04; G06T 19/20; G06T 2219/2016; G01N 21/8851; G01N 2021/8854
(Continued)

(56) References Cited

U.S. PATENT DOCUMENTS

2017/0289447 A1* 10/2017 Nakao ................... H04N 23/45
2019/0026955 A1 1/2019 Ogata et al.

FOREIGN PATENT DOCUMENTS

JP 2017-168077 A 9/2017
JP 2017-182695 A 10/2017
(Continued)

OTHER PUBLICATIONS

Lvson, Paulo, et al. "CasCADe: A novel 4D visualization system for virtual construction planning." IEEE transactions on visualization and computer graphics 24.1 (2017): 687-697. (Year: 2017).*
Ding, Lieyun, Ying Zhou, and Burcu Akinci. "Building Information Modeling (BIM) application framework: The process of expanding from 3D to computable nD." Automation in construction 46 (2014): 82-93. (Year: 2014).*
(Continued)

*Primary Examiner* — Jonathan S Lee
(74) *Attorney, Agent, or Firm* — Studebaker Brackett PLLC

(57) ABSTRACT

In a case where a three-dimensional model of a construction stored in a storage is to be displayed on a display, an information display apparatus 10 accepts a view operation including an operation for enlarging the three-dimensional model from an operation interface and at least enlarges and displays the three-dimensional model. After a desired position on the three-dimensional model enlarged and displayed on the display is specified in accordance with a user operation, the information display apparatus identifies a three-dimensional position on the three-dimensional model corresponding to the position and identifies a management segment that is an inspection unit of the construction on the basis of the identified three-dimensional position. After the management segment is thus identified, the information display apparatus reads management information corresponding to the identified management segment from the storage and displays the management information on the display.

20 Claims, 7 Drawing Sheets

(51) Int. Cl.
*G06T 7/00* (2017.01)
*G06T 15/04* (2011.01)
*G06T 19/20* (2011.01)

(52) U.S. Cl.
CPC .............. *G06T 15/04* (2013.01); *G06T 19/20* (2013.01); *G01N 2021/8854* (2013.01); *G06T 2219/2016* (2013.01)

(58) Field of Classification Search
USPC ........................................................ 382/141
See application file for complete search history.

(56) References Cited

FOREIGN PATENT DOCUMENTS

| | | | | |
|---|---|---|---|---|
| JP | 2018151964 | A | * | 9/2018 |
| JP | 2019049951 | A | * | 3/2019 |

OTHER PUBLICATIONS

Mallasi, Zaki. "Dynamic quantification and analysis of the construction workspace congestion utilising 4D visualisation." Automation in Construction 15.5 (2006): 640-655. (Year: 2006).*
International Search Report issued in PCT/JP2020/021598; mailed Aug. 25, 2020.
International Preliminary Report on Patentability and Written Opinion issued in PCT/JP2020/021598; issued Jan. 18, 2022.
An Office Action; "Decision of Refusal," mailed by the Japanese Patent Office on Aug. 7, 2023, which corresponds to Japanese Patent Application No. 2021-532715 and is related to U.S. Appl. No. 17/572,704; with English language translation.
An Office Action; "Notice of Reasons for Refusal," mailed by the Japanese Patent Office on Mar. 10, 2023, which corresponds to Japanese Patent Application No. 2021-532715 and is related to U.S. Appl. No. 17/572,704; with English language translation.

* cited by examiner

[ORTHO-IMAGE]

[DAMAGE DIAGRAM]

[ORTHO-IMAGE + DAMAGE DIAGRAM]

| DAMAGE ID | DAMAGE TYPE | SIZE (WIDTH mm) | SIZE (LENGTH mm) | SIZE (AREA m$^2$) |
|---|---|---|---|---|
| C1 | CRACK | 0.55 | 1800 | – |
| C2 | CRACK | 0.60 | 700 | – |
| C3 | CRACK | 0.30 | 2000 | – |
| C4 | CRACK | 0.25 | 1000 | – |
| C5 | CRACK | 0.10 | 1500 | – |
| H1 | PEELING | – | – | 0.85 |

[DAMAGE DATA TABLE]

[REPAIR DIAGRAM]

| REPAIR ID | TYPE OF REPAIR METHOD | SIZE (WIDTH mm) | SIZE (LENGTH mm) | SIZE (AREA m²) |
|---|---|---|---|---|
| A1 | CRACK REPAIR WORK (CRACK FILLING METHOD) | 0.60 | 2550 | – |
| A2 | CRACK REPAIR WORK (CRACK INJECTION METHOD) | 0.30 | 3100 | – |
| D1 | CROSS-SECTION REPAIR WORK (FORMWORK INJECTION METHOD) | – | – | 1.2 |

[REPAIR DATA TABLE]

INFORMATION DISPLAY APPARATUS, INFORMATION DISPLAY METHOD, AND INFORMATION DISPLAY PROGRAM

CROSS-REFERENCE TO RELATED APPLICATIONS

This application is a Continuation of PCT International Application No. PCT/JP2020/021598 filed on Jun. 1, 2020, which claims priority under 35 U.S.C § 119(a) to Japanese Patent Application No. 2019-132789 filed on Jul. 18, 2019. Each of the above application(s) is hereby expressly incorporated by reference, in its entirety, into the present application.

BACKGROUND OF THE INVENTION

1. Field of the Invention

The present invention relates to an information display apparatus, an information display method, and an information display program and specifically relates to a technique for supporting inspection of constructions.

2. Description of the Related Art

Constructions, such as bridges, need to be regularly inspected for maintenance and repair of the constructions.

Inspection of a construction is conducted for each management segment of the construction and, for example, the degree of damage is evaluated and the properties of the external appearance are recorded for each management segment in accordance with inspection and evaluation criteria specified by, for example, the government or the local government.

Recently, an image processing method with which information associated with a position specified on a three-dimensional model of a target object, such as a construction, can be easily viewed has been proposed (JP2017-168077A).

In the image processing method described in JP2017-168077A, a three-dimensional model of a target object is generated from a plurality of captured images (two-dimensional images) obtained by image capturing of the target object, and a three-dimensional mesh that is an approximation of the three-dimensional model is generated. Then, two-dimensional development views (panoramic images) of respective partial flat surfaces of the generated three-dimensional mesh are generated.

In the image processing method, a panoramic image selected by a user as a viewing target from among the panoramic images of the respective partial flat surfaces of the three-dimensional mesh is displayed in a panoramic-image display region of a display unit, an inspection image (captured image) corresponding to a position specified by the user on the panoramic image is displayed in an inspection-image display region of the display unit, and content, such as a crack image, is superimposed on the inspection image and displayed as a note.

SUMMARY OF THE INVENTION

In the image processing method described in JP2017-168077A, from a three-dimensional mesh that represents the surface of a target object, such as a construction, panoramic images of respective partial flat surfaces of the three-dimensional mesh are generated, a panoramic image selected as appropriate from among the panoramic images of the respective partial flat surfaces is displayed in the panoramic-image display region of the display unit, and a captured image that is an inspection image corresponding to a position specified on the panoramic image is displayed in the inspection-image display region of the display unit. Therefore, an inspection image that corresponds to a position specified on the three-dimensional model displayed three-dimensionally is not displayed.

Further, the inspection image is a captured image or an image obtained by superimposing a note, such as a crack image, on a captured image and is not management information for each management segment of the construction.

The present invention has been made in view of the above-described circumstances, and an object thereof is to provide an information display apparatus, an information display method, and an information display program with which management information can be easily checked for each of the management segments of a construction by using a three-dimensional model of the construction.

To achieve the above-described object, an information display apparatus according to an aspect of the present invention includes: a storage unit that stores a three-dimensional model of a construction and management information for each of management segments of the construction; a first operation unit that, in a case where the three-dimensional model stored in the storage unit is to be displayed on a display unit, accepts a view operation including at least an operation for enlarging the three-dimensional model to be displayed on the display unit; a first display control unit that reads and displays on the display unit the three-dimensional model stored in the storage unit and at least enlarges and displays the three-dimensional model on the basis of the view operation; a second operation unit that accepts, in accordance with a user operation, positional information indicating a position on the three-dimensional model enlarged and displayed on the display unit; a management segment identification unit that identifies a three-dimensional position on the three-dimensional model on the basis of the accepted positional information and identifies a management segment, among the management segments, including the identified three-dimensional position; and a second display control unit that reads management information corresponding to the identified management segment from the storage unit and displays the read management information on the display unit.

According to the aspect of the present invention, the three-dimensional model of the construction is displayed on the display unit and the view operation for at least enlarging and displaying the three-dimensional model is performed. Accordingly, the user can easily specify a desired position on the construction while viewing the construction panoramically. After the desired position on the construction is specified, a three-dimensional position on the three-dimensional model corresponding to the position is identified, and a management segment, of the construction, including the identified three-dimensional position is identified. After the management segment of the construction is identified, management information corresponding to the identified management segment is read from the storage unit and displayed on the display unit. Accordingly, the user can easily check the desired management information.

Preferably, in the information display apparatus according to another aspect of the present invention, the management information is at least one of an ortho-image corresponding to the management segment of the construction, an ortho-image on which damage information is superimposed, a damage diagram, a damage data table, a repair diagram, or a repair data table.

Preferably, in the information display apparatus according to yet another aspect of the present invention, the management segments are segments of inspection units of a part and a member that constitute the construction.

Preferably, in the information display apparatus according to yet another aspect of the present invention, the first operation unit accepts the view operation for enlarging, reducing, translating, or rotating the three-dimensional model to be displayed on the display unit, and the first display control unit enlarges, reduces, translates, or rotates the three-dimensional model to be displayed on the display unit on the basis of the view operation accepted by the first operation unit.

In the information display apparatus according to yet another aspect of the present invention, the three-dimensional model is a three-dimensional model represented by a three-dimensional point cloud formed of three-dimensional information of a large number of points on a surface of the construction, a three-dimensional model representing the surface of the construction by an aggregate of polygons on the basis of the three-dimensional point cloud, or a three-dimensional model obtained by texture mapping in which captured images obtained by image capturing of the construction are mapped to the polygons.

Preferably, in the information display apparatus according to yet another aspect of the present invention, the first display control unit superimposes and displays a mark at a position, indicated by the positional information accepted by the second operation unit, on the three-dimensional model enlarged and displayed on the display unit.

Preferably, in the information display apparatus according to yet another aspect of the present invention, the first display control unit displays the three-dimensional model in a first display region of the display unit, and the second display control unit displays the management information in a second display region of the display unit.

Preferably, the information display apparatus according to yet another aspect of the present invention further includes a display switching unit that switches between display of the three-dimensional model on the display unit by the first display control unit and display of the management information on the display unit by the second display control unit.

An information display method according to yet another aspect of the present invention includes: a step of preparing a storage unit that stores a three-dimensional model of a construction and management information for each of management segments of the construction; a step, by a first operation unit, in a case where the three-dimensional model stored in the storage unit is to be displayed on a display unit, of accepting a view operation including at least an operation for enlarging the three-dimensional model to be displayed on the display unit; a first display step, by a first display control unit, of reading and displaying on the display unit the three-dimensional model stored in the storage unit, the first display step including at least enlarging and displaying the three-dimensional model on the basis of the view operation accepted by the first operation unit; a step, by a second operation unit, of accepting, in accordance with a user operation, positional information indicating a position on the three-dimensional model enlarged and displayed on the display unit; a step, by a management segment identification unit, of identifying a three-dimensional position on the three-dimensional model on the basis of input specification of the position accepted by the second operation unit and identifying a management segment, among the management segments, including the identified three-dimensional position; and a second display step, by a second display control unit, of reading management information corresponding to the identified management segment from the storage unit and displaying the read management information on the display unit.

Preferably, in the information display method according to yet another aspect of the present invention, the management information is at least one of an ortho-image corresponding to the management segment of the construction, an ortho-image on which damage information is superimposed, a damage diagram, a damage data table, a repair diagram, or a repair data table.

Preferably, in the information display method according to yet another aspect of the present invention, the management segments are segments of inspection units of a part and a member that constitute the construction.

Preferably, in the information display method according to yet another aspect of the present invention, the step of accepting the view operation includes accepting the view operation for enlarging, reducing, translating, or rotating the three-dimensional model to be displayed on the display unit, and the first display step includes enlarging, reducing, translating, or rotating the three-dimensional model to be displayed on the display unit on the basis of the view operation accepted by the first operation unit.

In the information display method according to yet another aspect of the present invention, the three-dimensional model is a three-dimensional model represented by a three-dimensional point cloud formed of three-dimensional information of a large number of points on a surface of the construction, a three-dimensional model representing the surface of the construction by an aggregate of polygons on the basis of the three-dimensional point cloud, or a three-dimensional model obtained by texture mapping in which captured images obtained by image capturing of the construction are mapped to the polygons.

An information display program according to yet another aspect of the present invention is an information display program to be installed in a computer capable of accessing a storage unit that stores a three-dimensional model of a construction and management information for each of management segments of the construction, the information display program causing the computer to implement: a function of, in a case where the three-dimensional model stored in the storage unit is to be displayed on a display unit, accepting a view operation including at least an operation for enlarging the three-dimensional model to be displayed on the display unit; a function of reading and displaying on the display unit the three-dimensional model stored in the storage unit and at least enlarging and displaying the three-dimensional model on the basis of the view operation; a function of accepting, in accordance with a user operation, positional information indicating a position on the three-dimensional model enlarged and displayed on the display unit; a function of identifying a three-dimensional position on the three-dimensional model on the basis of the accepted positional information and identifying a management segment, among the management segments, including the identified three-dimensional position; and a function of reading management information corresponding to the identified management segment from the storage unit and displaying the read management information on the display unit.

An information display apparatus according to yet another aspect of the present invention includes: a storage unit that stores a three-dimensional model of a construction and management information for each of management segments of the construction; and a processor that, in a case where the three-dimensional model stored in the storage unit is to be displayed on a display unit, accepts a view operation including at least an operation for enlarging the three-dimensional model to be displayed on the display unit, reads and displays on the display unit the three-dimensional model stored in the storage unit and at least enlarges and displays the three-dimensional model on the basis of the view operation, accepts, in accordance with a user operation, positional information indicating a position on the three-dimensional model enlarged and displayed on the display unit, identifies a three-dimensional position on the three-dimensional model on the basis of the accepted positional information and identifies a management segment, among the management segments, including the identified three-dimensional position, and reads management information corresponding to the identified management segment from the storage unit and displays the read management information on the display unit.

According to the present invention, the three-dimensional model of the construction is displayed on the display unit and the view operation for at least enlarging and displaying the three-dimensional model is performed. Accordingly, the user can easily specify a desired position on the construction while viewing the construction panoramically. After the desired position on the construction is specified, a management segment, of the construction, including a three-dimensional position on the three-dimensional model corresponding to the position is identified, and management information corresponding to the identified management segment is displayed on the display unit. Accordingly, the user can easily check the desired management information.

DESCRIPTION OF THE PREFERRED EMBODIMENTS

Hereinafter, preferred embodiments of an information display apparatus, an information display method, and an information display program according to the present invention will be described with reference to the attached drawings.

Hardware Configuration of Information Display Apparatus

Figure 1:
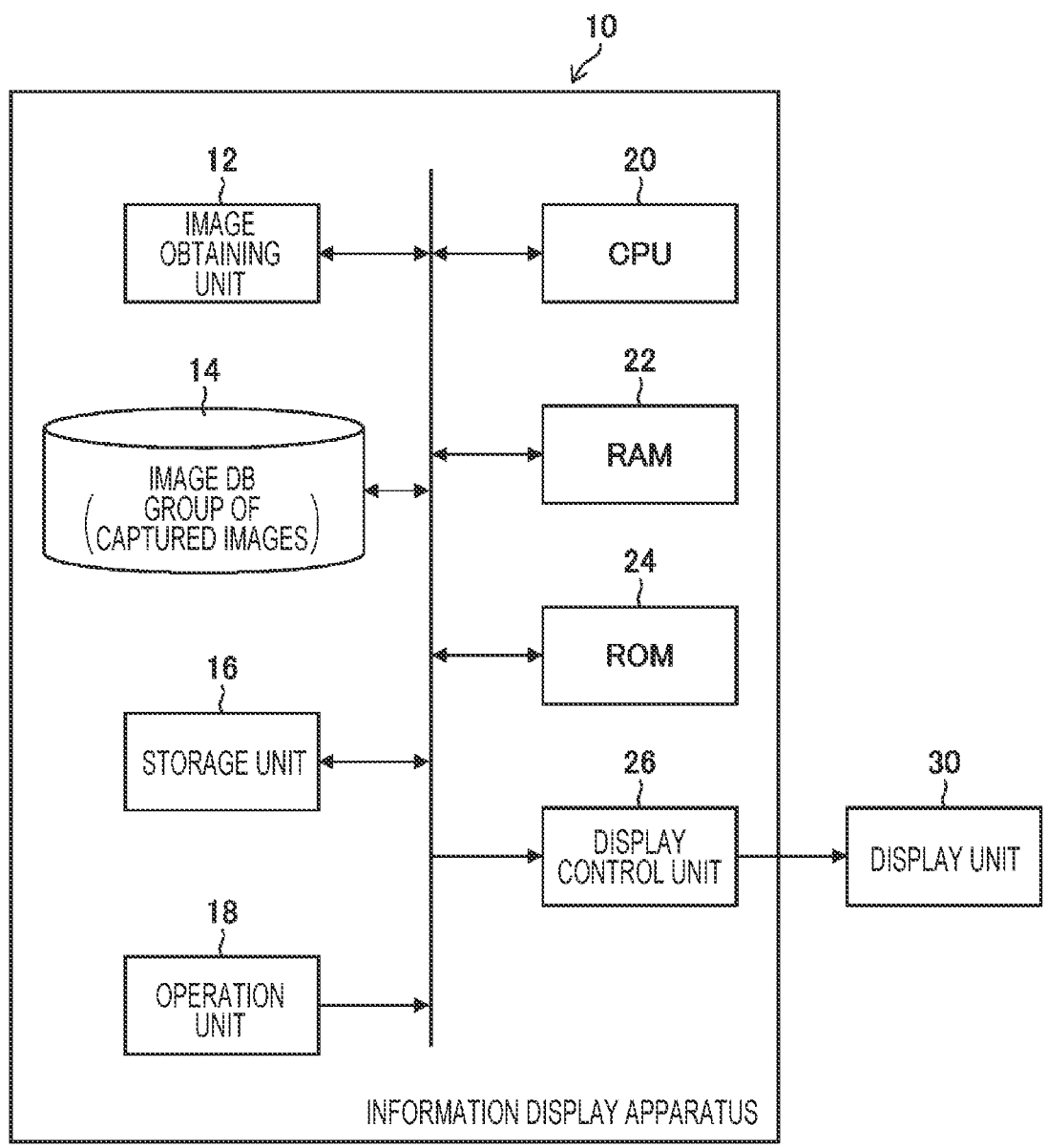
FIG. 1 is a block diagram illustrating an example hardware configuration of an information display apparatus according to the present invention.

FIG. 1 is a block diagram illustrating an example hardware configuration of the information display apparatus according to the present invention.

As an information display apparatus 10 illustrated in FIG. 1, a personal computer or a workstation can be used. The information display apparatus 10 of this example is mainly constituted by an image obtaining unit 12, an image database 14, a storage unit 16, an operation unit 18, a CPU (central processing unit) 20, a RAM (random access memory) 22, a ROM (read-only memory) 24, and a display control unit 26.

The image obtaining unit 12 corresponds to an input/output interface. In this example, the image obtaining unit 12 obtains, for example, captured images obtained by image capturing of an inspection target construction. Examples of an inspection target construction include constructions, such as a bridge and a tunnel.

Images obtained by the image obtaining unit 12 are, for example, a large number of images (group of captured images) obtained by image capturing of a construction using a drone (unattended flying device) in which a camera is mounted. The group of captured images completely covers the construction, and preferably, captured images adjacent to each other overlap such that the overlap is about 80% of each image.

The group of captured images obtained by the image obtaining unit 12 is stored in the image database 14.

The storage unit 16 is a storage unit formed of, for example, a hard disk device or a flash memory and stores, for example, a three-dimensional model of the construction, management information for each of the management segments of the construction, and information for associating the three-dimensional model and the management information with each other, in addition to an operating system, the information display program, and so on.

Here, the three-dimensional model includes a three-dimensional point cloud obtained by extracting feature points in overlapping captured images in the group of captured images stored in the image database 14 and estimating the position and attitude of the camera mounted in the drone on the basis of the extracted feature points. The three-dimensional model includes a three-dimensional point cloud obtained by simultaneously estimating the three-dimensional positions of the feature points from the results of estimation of the position and attitude of the camera.

A Structure from Motion (SfM) technique is available in which motion of a large number of feature points is tracked in the group of captured images in which the image capture position of the camera moves in accordance with movement of the drone, thereby estimating the three-dimensional structure of the construction and the attitude (motion) of the camera simultaneously. Recently, an optimized calculation method called bundle adjustment has been developed, which can provide highly accurate output.

As parameters (the focal length, the image size of the image sensor, the pixel pitch, and so on) of the camera necessary for using the SfM technique, parameters stored in the storage unit 16 can be used. Although it is not possible to obtain an absolute scale with the SfM technique, an absolute scale (three-dimensional position) can be obtained by giving a known size (for example, the distance between two points) of the construction.

Here, as the three-dimensional model, a three-dimensional model represented by a three-dimensional point cloud of a large number of points on the surface of the construction, a three-dimensional model representing the surface of the construction by an aggregate of polygons (for example, triangular patches) on the basis of the three-dimensional point cloud, or a three-dimensional model obtained by texture mapping in which captured images (textures) obtained by image capturing of the construction are mapped to the polygons is possible. It is assumed that the three-dimensional model of the construction of this example is a three-dimensional model obtained by texture mapping in which captured images are mapped to the polygons.

Regular inspection of the construction is conducted for each of the management segments that are segments of inspection units of parts and members that constitute the construction.

A description is given below while assuming, for example, a bridge as the construction.

Figure 4:
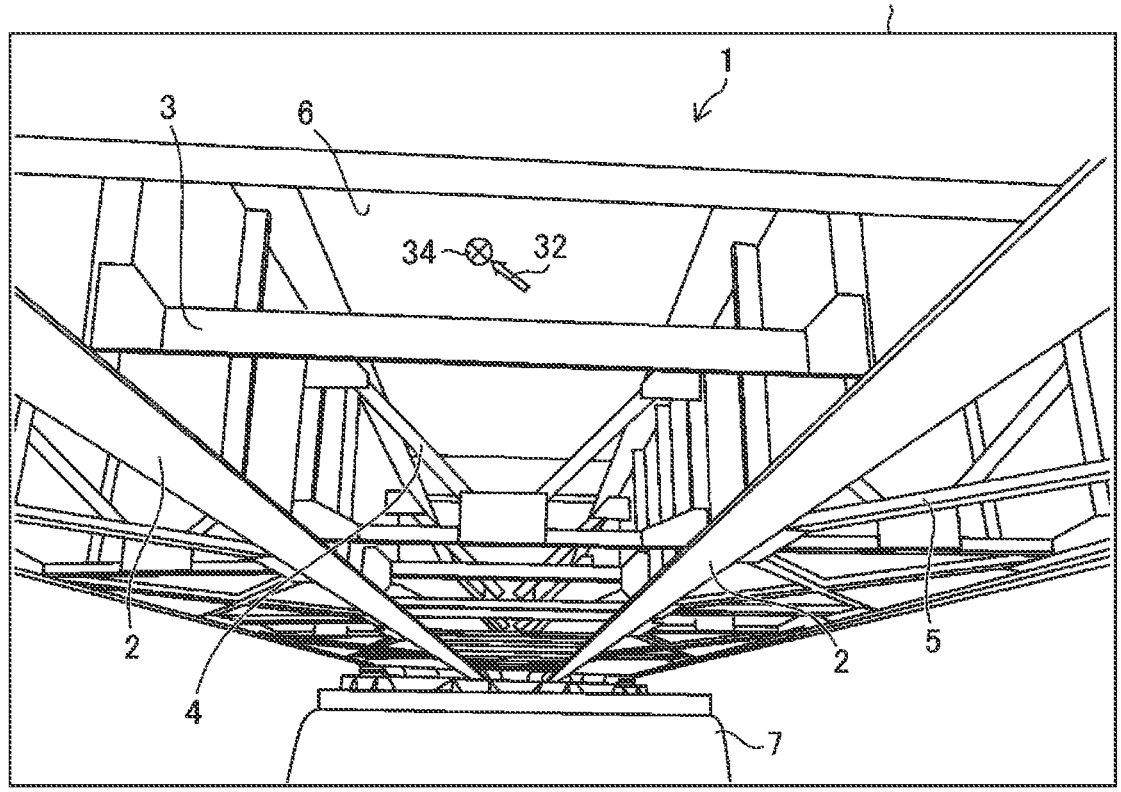
FIG. 4 is a diagram illustrating an example screen of the display unit on which a three-dimensional model of a bridge moved three-dimensionally by a view operation for enlargement and so on is displayed.

FIG. 4 illustrates an example of a screen 30A of a display unit 30 on which (a part of) a three-dimensional model of a bridge 1 is displayed.

The bridge 1 displayed on the screen 30A is constituted by various members including main girders 2 that are laid over piers 7, cross girders 3 that are provided in a direction orthogonal to the main girders 2 and each couple the main girders 2, and sway bracing 4 and lateral bracing 5 that couple the main girders 2 to each other to resist lateral loads imposed by, for example, winds or earthquakes. Over the main girders 2 and so on, a floor slab 6 on which vehicles and so on are traveling is formed by pouring concrete. The floor slab 6 is typically built of reinforced concrete.

The floor slab 6 is usually constituted by panels, which are basic units, having a rectangular shape and each defined by the main girders 2 and the cross girders 3. Inspection of the floor slab 6 for damage (cracks, concrete peeling, and so on) is conducted for each panel.

Therefore, each panel of the floor slab 6 is one of the management segments that are inspection units of parts and members that constitute the construction (bridge). Segments of parts and members that constitute the construction and that can be management segments of the bridge include segments of parts and members that constitute the construction (the main girders 2, the cross girders 3, the sway bracing 4, the lateral bracing 5, and the piers 7 (pillar parts, wall parts, beam parts, corner parts, and joint parts)) in addition to the floor slab 6 (panels).

As the management information for each of the management segments of the construction stored in the storage unit 16, an ortho-image corresponding to the management segment of the construction, an ortho-image on which damage diagram is superimposed, a damage diagram, a damage data table, a repair diagram, or a repair data table is possible. These types of management information are created when inspection of the construction is conducted or when repair is made, which will be described in detail below.

The operation unit 18 includes a UI (user interface) including a keyboard, a mouse, and so on connected to the computer by wire or wirelessly. In this example, the keyboard, the mouse, and so on function as an operation unit that accepts usual operations input to the computer, also function as a first operation unit that accepts a view operation including at least an operation for enlarging a three-dimensional model to be displayed on the display unit 30, and further function as a second operation unit that accepts, in accordance with a user operation, positional information indicating a position on the three-dimensional model enlarged and displayed on the display unit 30.

The CPU 20 accepts input from the first operation unit and the second operation unit and performs various processes. Specifically, the CPU 20 reads various programs stored in, for example, the storage unit 16 or the ROM 24 to centrally control each unit and perform various processes including a process for generating a three-dimensional model and management information. The CPU 20 also functions as a management segment identification unit that identifies a management segment of the construction as described below.

The RAM 22 is used as a work area of the CPU 20 and is used as a storage unit that temporarily stores read programs and various types of data.

The display control unit 26 is formed of, for example, a GPU (graphics processing unit), and creates and outputs to the display unit 30 display data for display on the display unit 30. In this example, the display control unit 26 functions as a first display control unit that reads the three-dimensional model stored in the storage unit 16, displays an image that represents the three-dimensional model on the display unit 30, and at least enlarges and displays the three-dimensional model on the basis of a view operation for the three-dimensional model performed by using the operation unit 18. The display control unit 26 also functions as a second display control unit that reads from the storage unit 16 management information corresponding to the management segment identified by the management segment identification unit (CPU 20) and displays the read management information on the display unit 30. Note that the display control unit 26 may be implemented as the CPU 20 instead of the GPU described above.

As the display unit 30, any type of monitor, such as a liquid crystal monitor, that can be connected to the computer is used. The display unit 30 displays various types of information including a three-dimensional model and management information on the basis of display data input from the display control unit 26 and is also used as a part of the user interface together with the operation unit 18.

The information display apparatus 10 thus configured displays various types of information on the display unit 30 in accordance with an operation using the operation unit 18, by the CPU 20 reading a program stored in the storage unit 16 or the ROM 24 and executing the program in accordance with an instruction input from the operation unit 18.

Information Display Method

Figure 2:
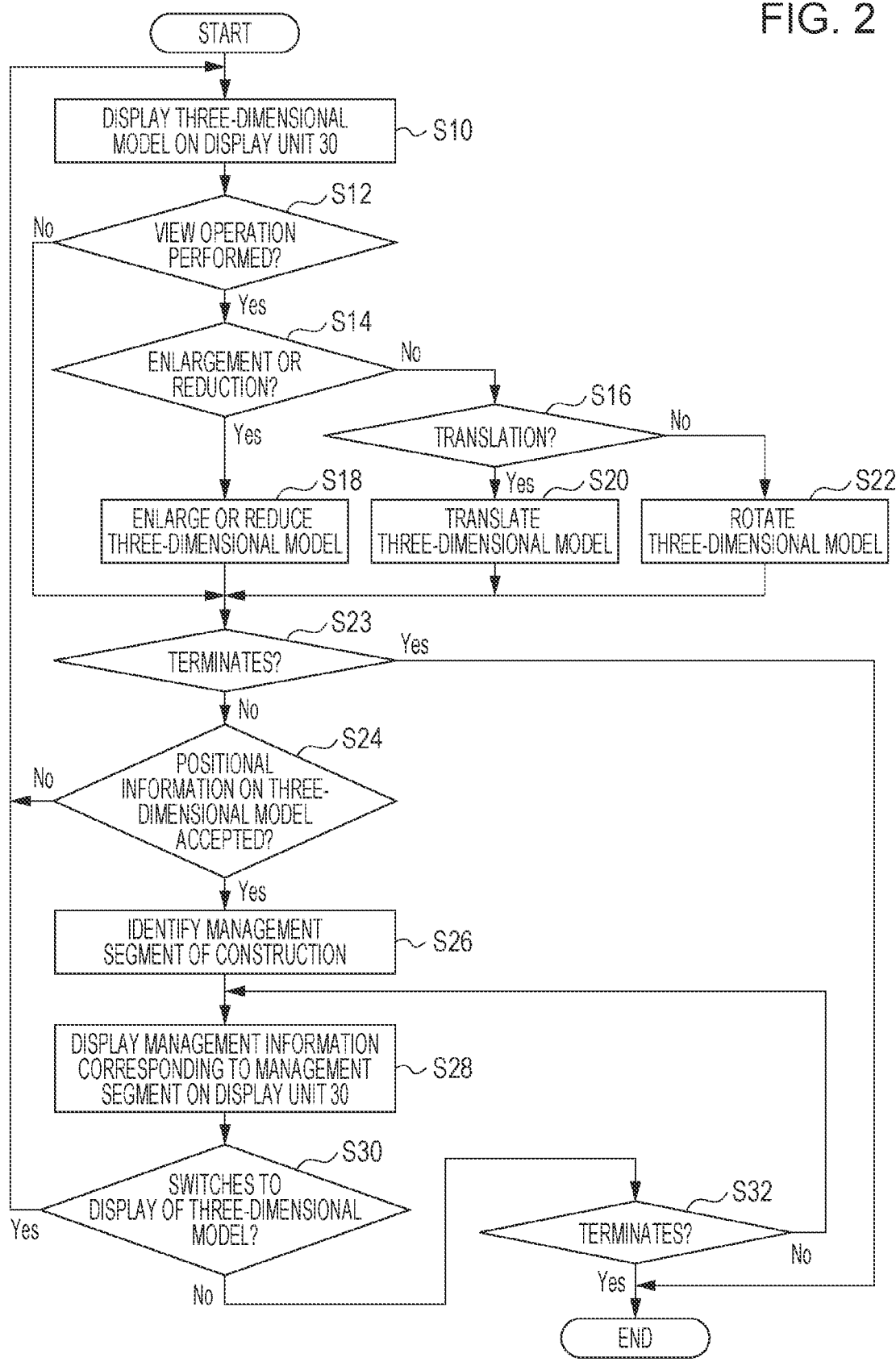
FIG. 2 is a flowchart illustrating an embodiment of an information display method according to the present invention.

FIG. 2 is a flowchart illustrating an embodiment of the information display method according to the present invention.

With reference to FIG. 2, the information display method according to the present invention will be described by describing operations of the units of the information display apparatus 10 illustrated in FIG. 1.

In the storage unit 16 of the information display apparatus 10, a three-dimensional model of a construction (a bridge in this example) and management information for each of the management segments of the construction are stored. To perform the information display method of this example, the storage unit 16 as described above is to be prepared in advance.

The display control unit 26 of the information display apparatus 10 first reads the three-dimensional model stored in the storage unit 16 and displays the three-dimensional model on the display unit 30 (step S10, first display step).

Figure 3:
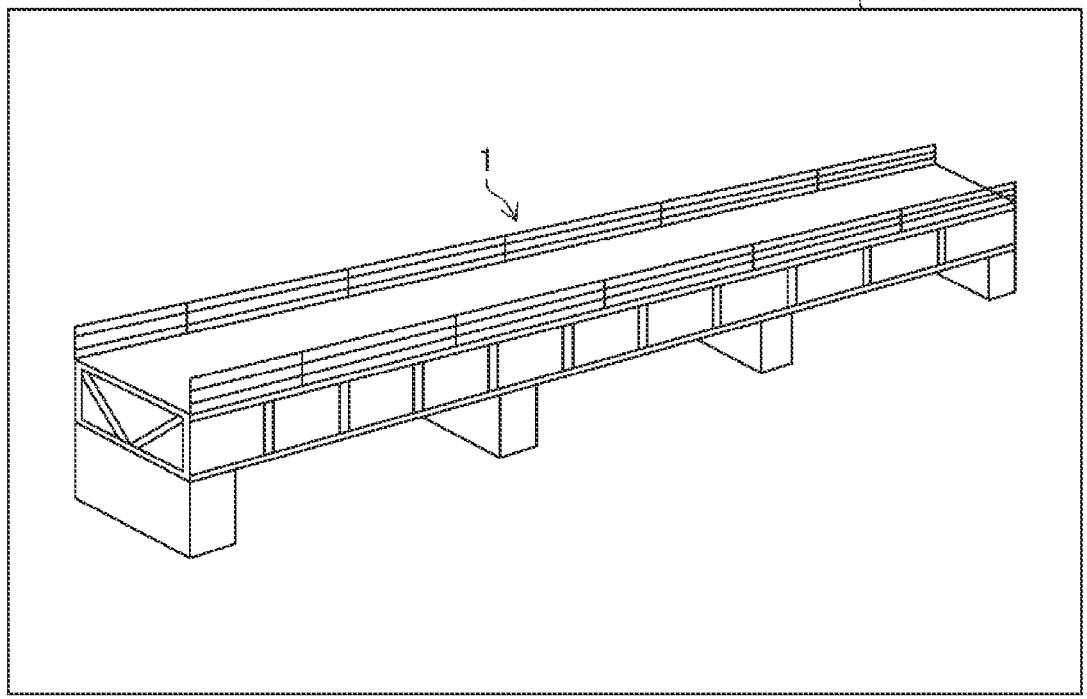
FIG. 3 is a diagram illustrating an example screen of a display unit on which a three-dimensional model representing an overall view of a bridge is displayed.

Here, in a case where the display control unit 26 displays the three-dimensional model on the display unit 30 for the first time, the display control unit 26 displays the three-dimensional model that represents an overall view of the bridge on the screen 30A of the display unit 30 such that the user can grasp the all aspects of the bridge 1 that is a construction, as illustrated in FIG. 3.

Subsequently, the CPU 20 or the display control unit 26 determines whether a view operation including at least an operation for enlargement is performed by the user for the three-dimensional model displayed on the screen 30A (step S12). A view operation is an operation for enlarging and displaying the three-dimensional model displayed on the screen 30A in three dimensions (3D), reducing and displaying the three-dimensional model, translating the three-dimensional model, or rotating the three-dimensional model and is performed by using the operation unit 18 that functions as the first operation unit. In this case, although a 3D mouse is suitable as the first operation unit that accepts the view operation by the user, a usual mouse or the like can be used. Processes from S12 to S22 can be repeated till all request at S12 have been treated.

If it is determined in step S12 that a view operation is performed (in the case of "Yes"), the CPU 20 or the display control unit 26 determines whether the view operation includes an operation for enlarging or reducing the three-dimensional model, an operation for translating the three-dimensional model, or an operation for rotating the three-dimensional model (step S14 and step S16).

If the view operation that includes an operation for enlarging or reducing the three-dimensional model is performed by using the operation unit 18, the display control unit 26 that functions as the first display control unit creates display data for enlarging or reducing the three-dimensional model in accordance with an instruction for enlargement or reduction given by the view operation and outputs the display data to the display unit 30 (step S18). If the view operation that includes an operation for translating the three-dimensional model is performed by using the operation unit 18, the display control unit 26 creates display data for translating the three-dimensional model in accordance with an instruction for translation given by the view operation and outputs the display data to the display unit 30 (step S20). If the view operation that includes an operation for rotating the three-dimensional model is performed by using the operation unit 18, the display control unit 26 creates display data for rotating the three-dimensional model in accordance with an instruction for rotation given by the view operation and outputs the display data to the display unit 30 (step S22).

If it is determined in step S12 that a view operation is not performed (in the case of "No") or when the process in step S18, S20, or S22 ends, the flow proceeds to step S23.

In step S23, the CPU 20 determines whether an instruction for terminating this information display from the operation unit 18 is input. If an instruction for termination is not input (in the case of "No"), the flow proceeds to step S24. If an instruction for termination is input (in the case of "Yes"), the process for this information display is terminated.

Next, the CPU 20 determines whether positional information indicating a position on the three-dimensional model enlarged and displayed on the display unit 30 is accepted in accordance with a user operation using the operation unit 18 that functions as the second operation unit (step S24).

If positional information indicating a position on the three-dimensional model is not accepted (in the case of "No"), the flow returns to step S10, and the display control unit 26 continuously displays the three-dimensional model on the display unit 30. In a case where a view operation has been performed and display data for enlarging or reducing the three-dimensional model, display data for translating the three-dimensional model, or display data for rotating the three-dimensional model has been created in step S18, S20, or S22, the three-dimensional model enlarged or reduced, translated, or rotated (moved three-dimensionally) on the basis of the latest display data is displayed on the display unit 30.

FIG. 4 is a diagram illustrating an example of the screen 30A of the display unit 30 on which a three-dimensional model of a bridge moved three-dimensionally by a view operation for enlargement and so on is displayed.

That is, in accordance with a view operation by the user, the three-dimensional model of the bridge 1 to be displayed on the screen 30A of the display unit 30 can be changed from the three-dimensional model representing an overall view of the bridge 1 illustrated in FIG. 3 to the three-dimensional model that is enlarged, moved, and rotated as illustrated in FIG. 4. The view operation is performed in order to allow a portion that requires inspection to be easily visible to the user while the user is grasping the all aspects of the bridge in space with the three-dimensional model.

FIG. 4 illustrates a cursor 32 that indicates an input position on the screen 30A of the display unit 30. The cursor 32 can be moved on the screen 30A in accordance with an operation using the operation unit 18 (a pointing device, such as a mouse).

In a case where the user wants to check management information of a desired management segment of the bridge, the user moves the three-dimensional model three-dimensionally while grasping the all aspects of the bridge in space with the three-dimensional model to search for the desired management segment on the screen 30A of the display unit 30. The user moves the cursor 32 onto the desired management segment on the screen 30A of the display unit 30 and performs an input operation by a click operation using a mouse or by using an execution key. Accordingly, a position on the three-dimensional model displayed on the screen 30A of the display unit 30 can be specified with the operation unit 18, and the operation unit 18 can accept positional information indicating the specified position.

In FIG. 4, the cursor 32 is positioned on a specific panel (management segment) included in the floor slab 6 of the bridge 1. When, for example, a click operation using a mouse is performed at this time, preferably, the display control unit 26 that functions as the first display control unit superimposes and displays a mark 34 indicating that an instruction for selecting the desired management segment has been performed, at the position indicated by the cursor 32 on the three-dimensional model.

Referring back to FIG. 2, if it is determined in step S24 that positional information indicating a position on the three-dimensional model enlarged an displayed on the display unit 30 is accepted (in the case of "Yes"), the flow proceeds to step S26, and the CPU 20 that functions as the management segment identification unit identifies a management segment of the bridge.

The management segment identification unit first identifies a three-dimensional position on the three-dimensional model on the basis of the positional information indicating the position indicated by the cursor 32 on (the three-dimensional model displayed on) the screen 30A of the display unit 30. The positional information indicating the position indicated by the cursor 32 on the screen 30A of the display unit 30 can be obtained as coordinate information of the position on the screen 30A. Meanwhile, the three-dimensional model displayed on the screen 30A of the display unit 30 has been enlarged, translated, and rotated by the view operation.

Therefore, the three-dimensional position on the three-dimensional model can be identified on the basis of the positional information (coordinate information) indicating the position on the three-dimensional model subjected to the view operation for enlargement and so on and displayed on the screen 30A of the display unit 30 and on the basis of information about the enlargement ratio, the amount of translation, and the amount of rotation of the three-dimensional model based on the view operation.

On the basis of the identified three-dimensional position on the three-dimensional model, the management segment identification unit identifies a management segment, of the bridge, including the three-dimensional position. Here, it is assumed that each management segment has three-dimensional information of the management segment. The three-dimensional information for each management segment can be, for example, a three-dimensional point cloud on the management segment (part or member) or three-dimensional information of feature points on the management segment (for example, in a case of a panel, four feature points in the four corners of the panel).

Therefore, on the basis of the identified three-dimensional position on the three-dimensional model, the management segment identification unit can identify a management segment having three-dimensional information indicating a position the same as or closest to the three-dimensional position as the management segment, of the bridge, including the three-dimensional position.

After the management segment of the bridge is identified by the management segment identification unit, the display control unit 26 that functions as the second display control unit reads management information corresponding to the identified management segment from the storage unit 16 and displays the read management information on the display unit 30 (step S28, second display step).

Accordingly, when the position of a portion that requires inspection is specified on the three-dimensional model of the bridge that has been moved three-dimensionally by the view operation, management information of the management segment identified on the basis of the specified position can be displayed on the display unit 30, and desired management information can be easily checked.

In this example, the CPU 20 that functions as a display switching unit switches the function of the display control unit 26 from the first display control unit to the second display control unit in a case of displaying management information on the display unit 30. Switching of display from the three-dimensional model to management information by the display switching unit can be automatically performed when a management segment of the bridge is identified and display of management information corresponding to the identified management segment becomes possible.

Management Information

Now, management information of a management segment of the bridge will be described.

A case where a certain panel that constitutes the floor slab 6 of the bridge 1 is identified as one of the management segments of the bridge will be described below.

As a first example of management information of the panel, an ortho-image corresponding to the panel is possible.

Figure 5:
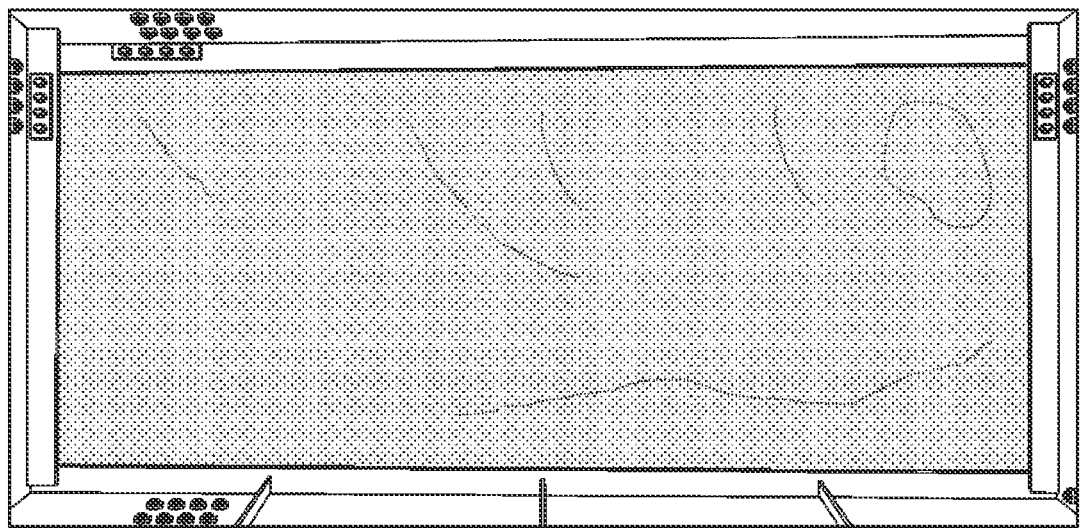
FIG. 5 is a diagram illustrating an example ortho-image corresponding to a panel that is one of the management segments of a bridge.

FIG. 5 is a diagram illustrating an example ortho-image corresponding to the panel of the bridge.

The ortho-image is an image obtained by orthogonal projection of captured images of the photographic subject (panel) onto the surface of the panel. An ortho-image of one panel can be created by extracting a plurality of captured images corresponding to the panel from the group of captured images stored in the image database 14, performing panoramic composition of the plurality of extracted captured images, and performing a projective transformation of the panoramic composite image such that the panoramic composite image is an image that is orthogonally projected onto the surface of the panel.

Panoramic composition of the plurality of captured images can be performed by image processing in which a plurality of feature points in an overlap region of overlapping captured images are extracted and the plurality of extracted feature points in one of the overlapping captured images are made to correspond to those in the other overlapping captured image respectively. Orthogonal projection of the panoramic composite image onto the surface of the panel can be performed by a projective transformation in which positions corresponding to the four corners of the panel in the panoramic composite image are made to correspond to the three-dimensional positions of the four corners of the panel.

The three-dimensional model of this example is a three-dimensional model obtained by texture mapping in which captured images are mapped to the polygons. Therefore, when the three-dimensional model is enlarged and displayed, the properties of the surface of the bridge (panel) can be checked to some extent. However, it is not possible to check slight damage (for example, a crack having a width of 0.1 mm). This is because the data amount of the three-dimensional model is limited and even when the three-dimensional model is enlarged, it is not possible to visually recognize the three-dimensional model as the original captured image or an image equivalent to the original captured image.

In contrast, when an ortho-image of a management segment that is small relative to the entire bridge is displayed, damage and so on of the management segment can be checked.

As a second example of management information of the panel, a damage diagram corresponding to the panel is possible.

Figure 6:
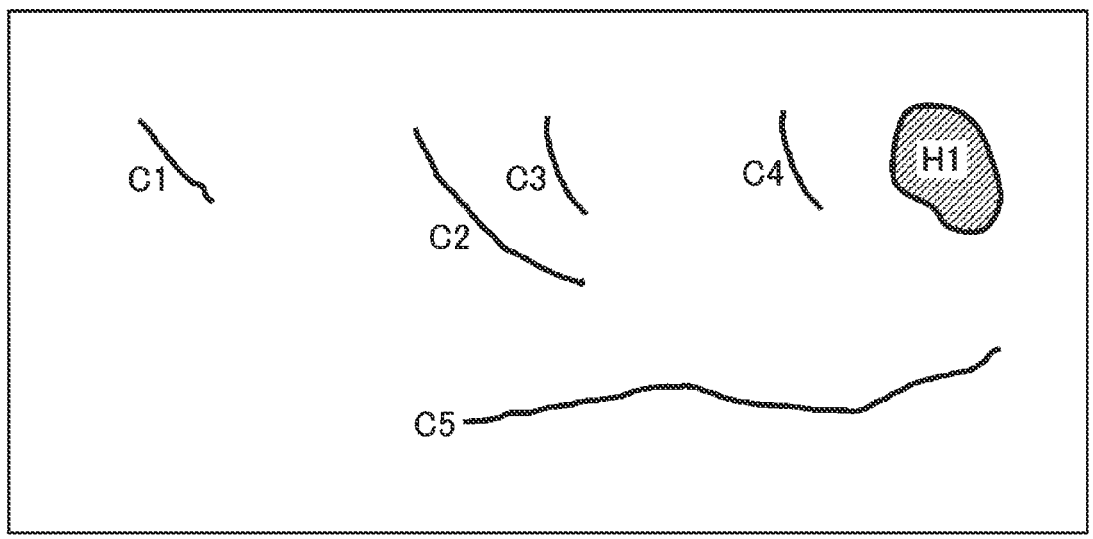
FIG. 6 is a diagram illustrating an example damage diagram corresponding to a panel.

FIG. 6 is a diagram illustrating an example damage diagram corresponding to the panel.

The damage diagram illustrated in FIG. 6 shows five cracks C1 to C5 and concrete peeling H1. The damage diagram can be generated by manually tracing damage, such as cracks and peeling, visually recognized on the ortho-image or by performing image processing for automatically detecting damage from the ortho-image and manually making a correction as necessary.

As a third example of management information of the panel, an ortho-image on which a damage diagram corresponding to the panel is superimposed is possible.

Figures 7, 8:
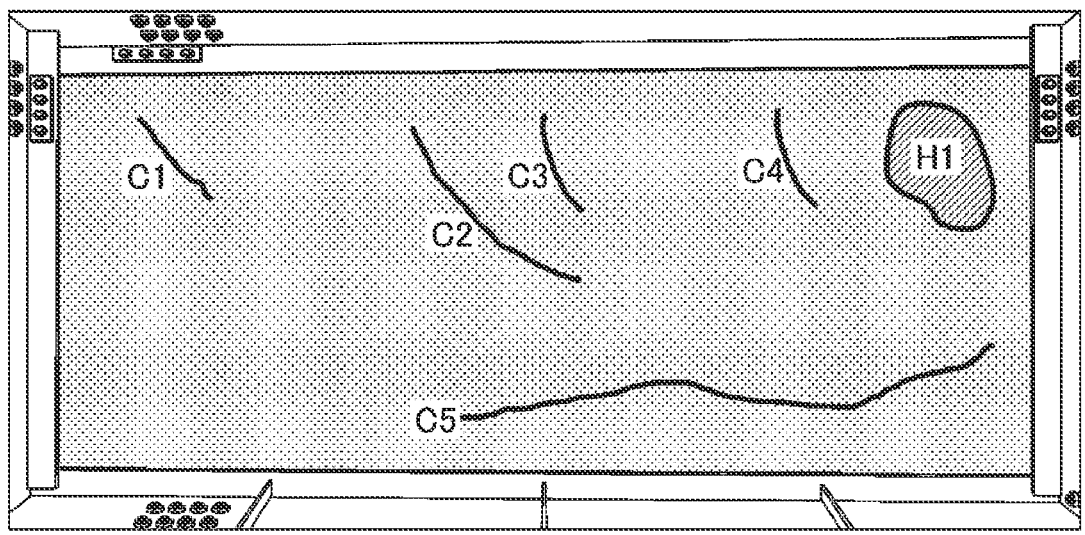
FIG. 7 is a diagram illustrating an example ortho-image on which a damage diagram corresponding to a panel is superimposed.
FIG. 8 is a diagram illustrating an example damage data table corresponding to a panel.

FIG. 7 is a diagram illustrating an example ortho-image on which a damage diagram corresponding to the panel is superimposed.

The ortho-image illustrated in FIG. 7 on which a damage diagram is superimposed can be created by superimposing the damage diagram illustrated in FIG. 6 on the ortho-image illustrated in FIG. 5.

The damage diagram is created while damage portions are shown in a conspicuous color, such as red. When the damage diagram is superimposed on the ortho-image, the damage portions can be visually recognized easily.

As a fourth example of management information of the panel, a damage data table corresponding to the panel is possible.

FIG. 8 is a diagram illustrating an example damage data table corresponding to the panel.

The damage data table illustrated in FIG. 8 has items, that is, a damage ID (identification), a damage type, a size (width), a size (length), and a size (area), and includes information corresponding to each item for each damage portion.

Note that in a case where the damage data table is displayed as management information, it is preferable to also display the damage diagram.

As a fifth example of management information of the panel, a repair diagram corresponding to the panel is possible.

Figures 9, 10:
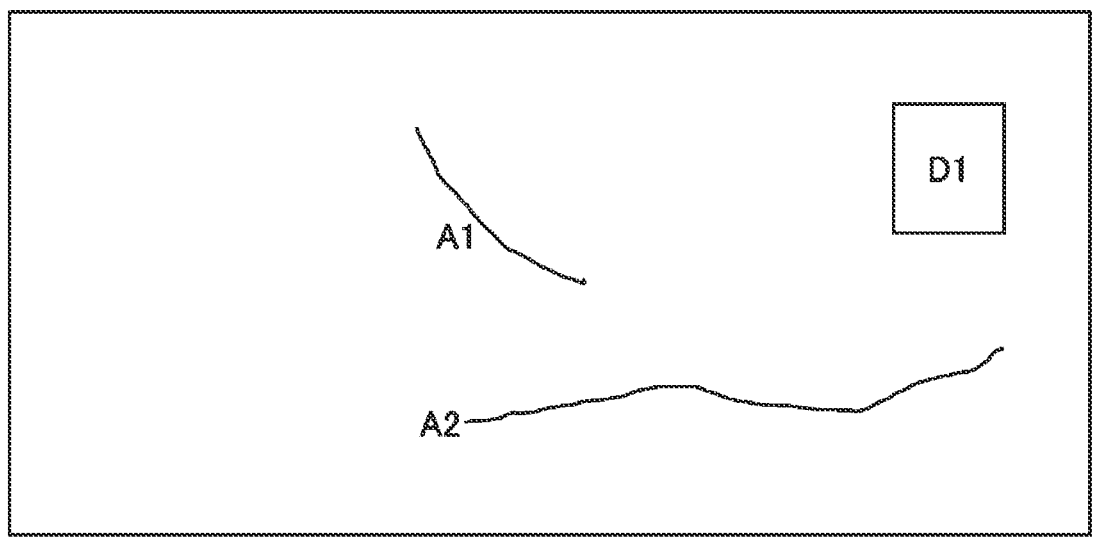
FIG. 9 is a diagram illustrating an example repair diagram corresponding to a panel.
FIG. 10 is a diagram illustrating an example repair data table corresponding to a panel.

FIG. 9 is a diagram illustrating an example repair diagram corresponding to the panel.

The repair diagram illustrated in FIG. 9 shows two pieces of crack repair work A1 and A2 and a piece of cross-section repair work D1. The pieces of crack repair work A1 and A2 are pieces of repair work for the cracks C2 and C5 illustrated in FIG. 6 respectively, and the piece of cross-section repair work D1 is a piece of repair work for the concrete peeling H1 illustrated in FIG. 6.

When the repair diagram of the panel is displayed as management information of the panel, the results of repair of the panel can be checked.

As a sixth example of management information of the panel, a repair data table corresponding to the panel is possible.

FIG. 10 is a diagram illustrating an example repair data table corresponding to the panel.

The repair data table illustrated in FIG. 10 has items, that is, a repair ID, the type of repair method, a size (width), a size (length), and a size (area), and includes information corresponding to each item for each repair portion.

For crack repair work, methods, such as a crack filling method in which concrete is cut along the crack and the cut portion is filled with a repairing material and a crack injection method in which a repairing material is injected into the crack under a specific injection pressure by using a dedicated holding device, are available. As the type of repair method, a method among the above-described methods that has been used in the crack repair work is indicated.

For cross-section repair work, methods, such as a formwork injection method in which formwork is placed and an injectable material is injected, a plastering method in which a cross-section repairing material is applied, and a spray method in which a cross-section repairing material is sprayed by using compressed air or the like, are available. As the type of repair method, a method among the above-described methods that has been used in the cross-section repair work is indicated.

Note that in a case where the repair data table is displayed as management information, it is preferable to also display the repair diagram.

Any one of the first to sixth examples of management information respectively illustrated in FIG. 5 to FIG. 10 or any combination of two or more of the first to sixth examples of management information can be displayed on the screen 30A of the display unit 30. The user may be allowed to select, as appropriate, a piece of management information to be displayed. Further, management information is not limited to those described above and, for example, "cause of damage", "evaluation of damage", and "event caused by damage" (for example, water leakage, dripping rust, free lime, exposure of reinforcing rods, or the like) can be assumed to be management information.

Referring back to FIG. 2, after the management information is displayed on the display unit 30, the CPU 20 subsequently determines whether display on the display unit 30 is to be switched from the management information to the three-dimensional model (step S30).

Determination as to whether to switch from the management information to the three-dimensional model can be performed on the basis of a user operation using the operation unit 18. For example, when the user wants to check management information of a different management segment, the user can perform an operation of switching from the management information to the three-dimensional model by using the operation unit 18.

If it is determined in step S30 that display is to be switched from the management information to the three-dimensional model (in the case of "Yes"), the CPU 20 returns the flow to step S10.

Accordingly, the three-dimensional model that represents an overall view of the bridge can be displayed on the display unit 30. In a case of displaying the three-dimensional model on the display unit 30, the CPU 20 that functions as the display switching unit can switch the function of the display control unit 26 from the second display control unit to the first display control unit.

If it is determined that display is to be switched from the management information to the three-dimensional model (in the case of "Yes"), the CPU 20 may return the flow to step S12. Accordingly, the three-dimensional model displayed last at the time of switching of display from the three-dimensional model to the management information can be displayed, and this is suitable in a case where the user wants to check management information of a management segment close to the previous management segment.

On the other hand, if it is determined in step S30 that display is not to be switched from the management information to the three-dimensional model (in the case of "No"), the flow proceeds to step S32.

In step S32, the CPU 20 determines whether an instruction for terminating this information display from the operation unit 18 is input. If an instruction for termination is not input (in the case of "No"), the flow returns to step S28, and the management information is continuously displayed on the display unit 30. On the other hand, if an instruction for termination is input (in the case of "Yes"), the process for this information display is terminated.

Although switching between display of the three-dimensional model and display of the management information on the display unit 30 is performed on the basis of, for example, a user operation in this example, the three-dimensional model and the management information may be simultaneously displayed on the display unit 30.

Figure 11:
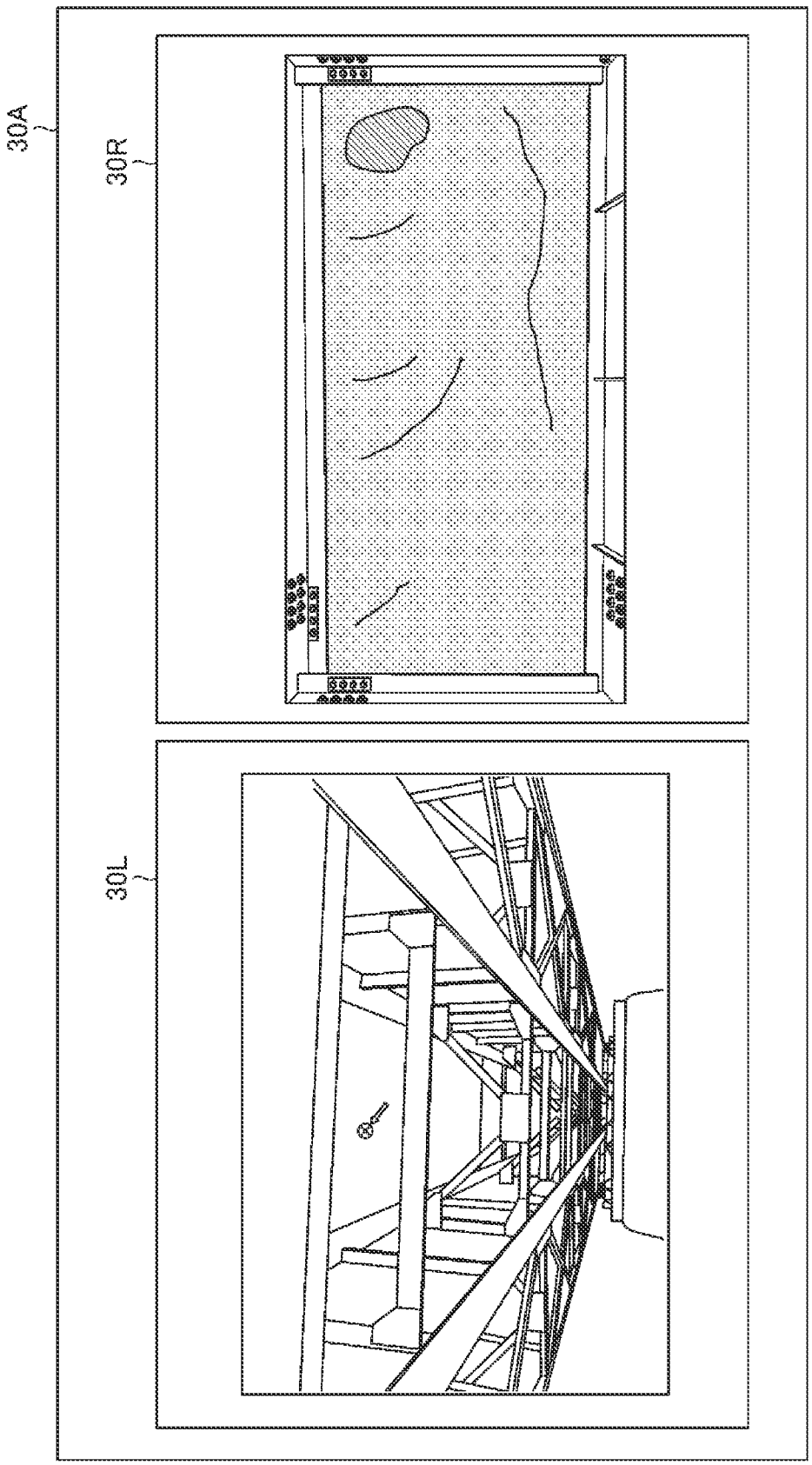
FIG. 11 is a diagram illustrating an example screen of the display unit on which a three-dimensional model and management information are simultaneously displayed.

FIG. 11 is a diagram illustrating an example of the screen 30A of the display unit 30 on which a three-dimensional model and management information are simultaneously displayed.

In the example illustrated in FIG. 11, a three-dimensional model is displayed in a first display region 30L on the left side of the screen 30A of the display unit 30, and an ortho-image on which a damage diagram is superimposed is displayed in a second display region 30R on the right side thereof as management information.

The user can three-dimensionally move the three-dimensional model of the bridge displayed in the first display region 30L by a view operation including an operation for enlarging the three-dimensional model. When the user specifies, with a mouse cursor, a position on the three-dimensional model enlarged and displayed in the first display region 30L, an ortho-image corresponding to a management segment, of the bridge, including the specified position can be displayed in the second display region 30R.

The user can compare the three-dimensional model and the ortho-image displayed side by side on the screen 30A of the display unit 30 with each other and can easily check desired management information.

Others

The three-dimensional model of the construction and the management information for each of the management segments of the construction stored in the storage unit 16 need not be generated by the information display apparatus 10 and may be generated by an external apparatus. In this case, a three-dimensional model and management information for each of the management segments of the construction generated by the external apparatus are stored in the storage unit 16.

The three-dimensional model is not limited to that generated by using the group of captured images obtained by image capturing of the construction and with the SfM technique and may be generated with any other method.

For example, a three-dimensional model of a construction can be generated by obtaining three-dimensional information of the construction from two parallax images captured with a twin-lens camera and using the obtained three-dimensional information. A three-dimensional model of a construction can be generated by obtaining a captured image of the construction with a time-of-flight camera and obtaining three-dimensional coordinates of the construction corresponding to each pixel on the captured image. Further, a three-dimensional model of a construction can be generated on the basis of three-dimensional information of the construction obtained by a laser scanner that includes a camera function.

The hardware for implementing the information display apparatus according to the present invention can be configured as various processors. The various processors include a CPU (central processing unit), which is a general-purpose processor executing a program to function as various processing units, a programmable logic device (PLD), such as an FPGA (field-programmable gate array), which is a processor having a circuit configuration that is changeable after manufacture, and a dedicated electric circuit, such as an ASIC (application-specific integrated circuit), which is a processor having a circuit configuration specifically designed to perform specific processing. One processing unit that constitutes the information display apparatus may be configured as one of the various processors described above or two or more processors of the same type or different types. For example, one processing unit may be configured as a plurality of FPGAs or a combination of a CPU and an FPGA. Further, a plurality of processing units may be configured as one processor. As the first example of configuring a plurality of processing units as one processor, a form is possible where one or more CPUs and software are combined to configure one processor, and the processor functions as the plurality of processing units, a representative example of which is a computer, such as a client or a server. As the second example thereof, a form is possible where a processor is used in which the functions of the entire system including the plurality of processing units are implemented as one IC (integrated circuit) chip, a representative example of which is a system on chip (SoC). As described above, regarding the hardware configuration, the various processing units are configured by using one or more of the various processors described above. Further, the hardware configuration of the various processors is more specifically an electric circuit (circuitry) in which circuit elements, such as semiconductor elements, are combined.

Further, the present invention includes an information display program that is installed in a computer capable of accessing a storage unit storing a three-dimensional model of a construction and management information for each of the management segments of the construction and that causes the computer to function as the information display apparatus according to the present invention, and a storage medium to which the information display program is recorded.

Further, the present invention is not limited to the above-described embodiment and various modifications can be made without departing from the spirit of the present invention as a matter of course.

REFERENCE SIGNS LIST

1 bridge
2 main girder
3 cross girder
4 sway bracing
5 lateral bracing
6 floor slab
7 pier
10 information display apparatus
12 image obtaining unit
14 image database
16 storage unit
18 operation unit
20 CPU
22 RAM
24 ROM
26 display control unit
30 display unit
30A screen
30L first display region
30R second display region
32 cursor
34 mark
S10 to S32 step

What is claimed is:

1. An information display apparatus comprising:
a storage that stores a three-dimensional model of a construction and management information for each of management segments of the construction;
an operation interface that, in a case where the three-dimensional model stored in the storage is to be displayed on a display, accepts a view operation including at least an operation for enlarging the three-dimensional model to be displayed on the display;
a processor configured to
read and display on the display the three-dimensional model stored in the storage and at least enlarge and display the three-dimensional model on the basis of the view operation;
wherein the operation interface that accepts, in accordance with a user operation, positional information indicating a position of a point on the three-dimensional model enlarged and displayed on the display;
wherein the processor is configured to
identify a three-dimensional position on the three-dimensional model on the basis of the accepted positional information and identify a management segment, among the management segments, including the identified three-dimensional position; and read management information corresponding to the identified management segment from the storage and display the read management information on the display, and wherein the management segments are segments of inspection units of a part and a member that constitute the construction, for which regular inspection of the construction is conducted, and the management information is at least one of an ortho-image corresponding to the management segment of the construction, an ortho-image on which damage information is superimposed, a damage diagram, a damage data table, a repair diagram, or a repair data table.

2. The information display apparatus according to claim 1, wherein the management information is at least one of an ortho-image corresponding to the management segment of the construction, an ortho-image on which damage information is superimposed, a damage diagram, a damage data table, a repair diagram, or a repair data table.

3. The information display apparatus according to claim 2, wherein the management segments are segments of inspection units of a part and a member that constitute the construction.

4. The information display apparatus according to claim 2, wherein
the operation interface accepts the view operation for enlarging, reducing, translating, or rotating the three-dimensional model to be displayed on the display, and
the processor enlarges, reduces, translates, or rotates the three-dimensional model to be displayed on the display unit on the basis of the view operation.

5. The information display apparatus according to claim 2, wherein the three-dimensional model is a three-dimensional model represented by a three-dimensional point cloud formed of three-dimensional information of a large number of points on a surface of the construction, a three-dimensional model representing the surface of the construction by an aggregate of polygons on the basis of the three-dimensional point cloud, or a three-dimensional model obtained by texture mapping in which captured images obtained by image capturing of the construction are mapped to the polygons.

6. The information display apparatus according to claim 2, wherein the processor superimposes and displays a mark at a position, indicated by the positional information, on the three-dimensional model enlarged and displayed on the display.

7. The information display apparatus according to claim 2, wherein
the processor displays the three-dimensional model in a first display region of the display, and
the processor displays the management information in a second display region of the display.

8. The information display apparatus according to claim 2, the processor is further configured to switch between display of the three-dimensional model on the display and display of the management information on the display.

9. The information display apparatus according to claim 1, wherein the management segments are segments of inspection units of a part and a member that constitute the construction.

10. The information display apparatus according to claim 1, wherein
the operation interface accepts the view operation for enlarging, reducing, translating, or rotating the three-dimensional model to be displayed on the display, and
the processor enlarges, reduces, translates, or rotates the three-dimensional model to be displayed on the display unit on the basis of the view operation.

11. The information display apparatus according to claim 1, wherein the three-dimensional model is a three-dimensional model represented by a three-dimensional point cloud formed of three-dimensional information of a large number of points on a surface of the construction, a three-dimensional model representing the surface of the construction by an aggregate of polygons on the basis of the three-dimensional point cloud, or a three-dimensional model obtained by texture mapping in which captured images obtained by image capturing of the construction are mapped to the polygons.

12. The information display apparatus according to claim 1, wherein the processor superimposes and displays a mark at a position, indicated by the positional information, on the three-dimensional model enlarged and displayed on the display.

13. The information display method according to claim 12, wherein the three-dimensional model is a three-dimensional model represented by a three-dimensional point cloud formed of three-dimensional information of a large number of points on a surface of the construction, a three-dimensional model representing the surface of the construction by an aggregate of polygons on the basis of the three-dimensional point cloud, or a three-dimensional model obtained by texture mapping in which captured images obtained by image capturing of the construction are mapped to the polygons.

14. The information display apparatus according to claim 1, wherein
the processor displays the three-dimensional model in a first display region of the display, and
the processor displays the management information in a second display region of the display.

15. The information display apparatus according to claim 1, the processor is further configured to switch between display of the three-dimensional model on the display and display of the management information on the display.

16. An information display method comprising:
a step of preparing a storage that stores a three-dimensional model of a construction and management information for each of management segments of the construction;
a step, in a case where the three-dimensional model stored in the storage is to be displayed on a display unit, of accepting a view operation including at least an operation for enlarging the three-dimensional model to be displayed on the display;
a first display step of reading and displaying on the display the three-dimensional model stored in the storage, the first display step including at least enlarging and displaying the three-dimensional model on the basis of the view operation;
a step of accepting, in accordance with a user operation, positional information indicating a position of a point on the three-dimensional model enlarged and displayed on the display;
a step of identifying a three-dimensional position on the three-dimensional model on the basis of input specification of the position and identifying a management segment, among the management segments, including the identified three-dimensional position; and a second display step of reading management information corresponding to the identified management segment from the storage unit and displaying the read management information on the display, wherein the management segments are segments of inspection units of a part and a member that constitute the construction, for which regular inspection of the construction is conducted, and the management information is at least one of an ortho-image corresponding to the management segment of the construction, an ortho-image on which damage information is superimposed, a damage diagram, a damage data table, a repair diagram, or a repair data table.

17. The information display method according to claim 16, wherein the management information is at least one of an ortho-image corresponding to the management segment of the construction, an ortho-image on which damage information is superimposed, a damage diagram, a damage data table, a repair diagram, or a repair data table.

18. The information display method according to claim 16, wherein the management segments are segments of inspection units of a part and a member that constitute the construction.

19. The information display method according to claim 16, wherein
the step of accepting the view operation includes accepting the view operation for enlarging, reducing, translating, or rotating the three-dimensional model to be displayed on the display, and
the first display step includes enlarging, reducing, translating, or rotating the three-dimensional model to be displayed on the display on the basis of the view operation.

20. A non-transitory computer readable recording medium storing an information display program to be installed in a computer capable of accessing a storage that stores a three-dimensional model of a construction and management information for each of management segments of the construction, the information display program causing the computer to implement:
a function of, in a case where the three-dimensional model stored in the storage is to be displayed on a display, accepting a view operation including at least an operation for enlarging the three-dimensional model to be displayed on the display;
a function of reading and displaying on the display unit the three-dimensional model stored in the storage and at least enlarging and displaying the three-dimensional model on the basis of the view operation;
a function of accepting, in accordance with a user operation, positional information indicating a position of a point on the three-dimensional model enlarged and displayed on the display;
a function of identifying a three-dimensional position on the three-dimensional model on the basis of the accepted positional information and identifying a management segment, among the management segments, including the identified three-dimensional position; and
a function of reading management information corresponding to the identified management segment from the storage unit and displaying the read management information on the display,
wherein the management segments are segments of inspection units of a part and a member that constitute the construction, for which regular inspection of the construction is conducted, and the management information is at least one of an ortho-image corresponding to the management segment of the construction, an ortho-image on which damage information is superimposed, a damage diagram, a damage data table, a repair diagram, or a repair data table.

* * * * *